US007209877B2

(12) United States Patent
Han

(10) Patent No.: US 7,209,877 B2
(45) Date of Patent: Apr. 24, 2007

(54) METHOD FOR TRANSMITTING CHARACTER MESSAGE USING VOICE RECOGNITION IN PORTABLE TERMINAL

(75) Inventor: Kyu-Sung Han, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 823 days.

(21) Appl. No.: 10/341,907

(22) Filed: Jan. 14, 2003

(65) Prior Publication Data
US 2003/0236670 A1 Dec. 25, 2003

(30) Foreign Application Priority Data
Jun. 20, 2002 (KR) ............... 10-2002-0034668

(51) Int. Cl.
*G10L 19/00* (2006.01)
(52) U.S. Cl. ............... 704/201; 379/88.14; 379/201.03
(58) Field of Classification Search ........ 704/270–275, 704/201; 379/88.14, 201.03
See application file for complete search history.

(56) References Cited
U.S. PATENT DOCUMENTS
6,240,391 B1 * 5/2001 Ball et al. ................... 704/270

6,249,765 B1 * 6/2001 Adler et al. ................. 704/500
6,263,064 B1 * 7/2001 O'Neal et al. .......... 379/201.03
6,507,643 B1 * 1/2003 Groner ..................... 379/88.14
6,574,599 B1 * 6/2003 Lim et al. ................... 704/270
6,651,042 B1 * 11/2003 Field et al. ................. 704/270

* cited by examiner

*Primary Examiner*—Vijay Chawan
(74) *Attorney, Agent, or Firm*—The Farrell Law Firm

(57) ABSTRACT

A method for transmitting a character message using voice recognition in a portable terminal, includes the steps of: a) displaying a guidance message associated with a voice/character conversion service when the message is created; b) connecting the portable terminal to a base station when the voice/character conversion service is selected; c) transmitting a voice message from a user to the base station; d) storing the voice message in the base station; e) allowing the base station to convert the voice message into a character message; f) transmitting the character message to the portable terminal; g) inputting a destination number; and h) transmitting the character message to a destination terminal corresponding to the inputted destination number.

5 Claims, 4 Drawing Sheets

METHOD FOR TRANSMITTING CHARACTER MESSAGE USING VOICE RECOGNITION IN PORTABLE TERMINAL

PRIORITY

This application claims priority to an application entitled "METHOD FOR TRANSMITTING CHARACTER MESSAGE USING VOICE RECOGNITION IN PORTABLE TERMINAL", filed in the Korean Industrial Property Office on Jun. 20, 2002 and assigned Ser. No. 2002-34668, the contents of which are hereby incorporated by reference herein.

BACKGROUND OF THE INVENTION

1. Field of the Invention

The present invention relates to a portable terminal, and more particularly to a method for transmitting a character message using voice recognition in a portable terminal.

2. Description of the Related Art

A conventional portable terminal can carry out a voice communication function and also character and image message communications. The character message communication is based on an SMS (Short Message Service) transmitting a text sentence created by a user.

When the user creates a character message in the conventional portable terminal, the user individually strokes and combines keys associated with vowel and consonant letters and other characters arranged on a keypad, and then transmits the character message corresponding to the combined keys.

Since the user of the conventional portable terminal must individually stroke keys corresponding to the character message upon transmitting the character message, a certain minimum period of time is taken to create the character message and the period of time can increase according to the manipulative skill of the user and the length of the message.

In addition, where a called party cannot receive a call from a calling party, the calling party leaves a voice message for the called party. The called party often pays an additional communication fee to retrieve the voice message left by the calling party.

SUMMARY OF THE INVENTION

Therefore, the present invention has been made in view of the above problems, and it is an object of the present invention to provide a method for transmitting a character message using voice recognition in a portable terminal.

In accordance with one aspect of the present invention, the above and other objects can be accomplished by a method for transmitting a character message using voice recognition in a portable terminal, comprising the steps of: a) displaying a display item associated with selection of a voice/character conversion service; b) connecting the portable terminal to a base station when the voice/character conversion service is selected; c) transmitting a voice message from a user to the base station; d) storing the voice message in the base station; e) converting the voice message into a character message; F) transmitting the character message to the portable terminal; g) inputting a destination number; and h) transmitting the character message to a destination terminal corresponding to the inputted destination number.

In accordance with another aspect of the present invention, there is provided a method for transmitting a character message using voice recognition in a portable terminal, comprising the steps of: a) selecting a voice message option when a corresponding destination terminal cannot receive a call from the portable terminal; b) connecting the portable terminal to a base station when the voice message option is selected; c) transmitting a user's voice message to the base station; d) storing the voice message in the base station; e) converting the stored voice message into a character message; f) transmitting the character message to the portable terminal; and g) transmitting the character message to the destination terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will now be described in detail with reference to the annexed drawings.

Figure 1:
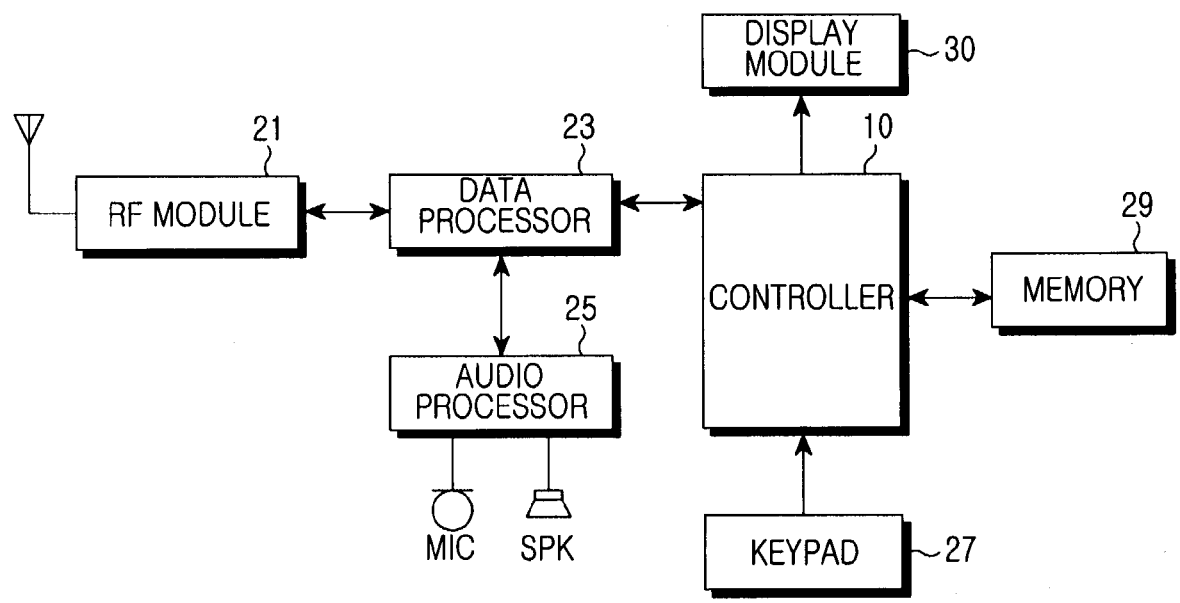
FIG. 1 is a view illustrating a configuration of a portable terminal in accordance with the present invention.

FIG. 1 illustrates a configuration of a portable terminal in accordance with the present invention. Referring to FIG. 1, an RF (Radio Frequency) module 21 supports communication of the portable terminal. The RF module 21 includes an RF transmitter for up-converting and amplifying a frequency of a signal to be transmitted and an RF receiver for carrying out a low noise amplification of a received signal and down-converting a frequency of the amplified signal. A data processor 23 includes a transmitter for coding and modulating the signal to be transmitted and a receiver for demodulating and decoding the received signal. In other words, the data processor 23 is made up of a modem and a codec.

An audio processor 25 reproduces a received audio signal outputted from the data processor 23 or transmits an audio signal generated from a microphone MIC to the data processor 23. A keypad 27 includes keys for inputting alphanumeric information and function keys for setting various functions.

A memory 29 is comprised of a program memory and a data memory. The program memory stores programs for controlling a general operation of the portable terminal. Further, the program memory stores a character message received from a base station in accordance with the embodiment of the present invention. The data memory temporarily stores data generated while the programs are carried out.

A controller 10 controls an entire operation of the portable terminal and the controller 10 can include the data processor 23. In accordance with the embodiment of the present invention, the controller 10 controls a display module 30 so that it can display a status message associated with a voice/character conversion service. When a user selects the voice/character conversion service in the portable terminal, the controller 10 controls the portable terminal so that it connects to the base station and transmits the voice message to the base station. When the base station converts the voice message received from the portable terminal into the character message, the controller 10 controls the display module 30 so that it displays status information indicating that the base station is currently converting the message.

Under control of the controller 10, the display module 30 displays messages generated while programs are executed. In accordance with the embodiment of the present invention, the display module 30 displays the status message associated with the voice/character conversion service and information indicating that the base station is currently converting the message.

The operation of the portable terminal will be described with reference to FIG. 1. Where the user transmits a call signal, the user performs a dialing operation and sets an operating mode of the portable terminal to a transmission mode using the keypad 27. The controller 10 responds to the transmission mode set by the user. The data processor 23 processes the dialing information. In response to the processed dialing information, the RF module 21 outputs an RF signal. If a destination subscriber generates a response signal to the transmitted RF signal, the RF module 21 and the data processor 23 receive the response signal. Thereafter, a voice communication path is established through the audio processor 25 and the user communicates with the destination subscriber.

When the portable terminal is in a reception mode, the controller 10 is notified of an incoming call in the reception mode through the data processor 23 and then generates a ring signal through the audio processor 25. Thereafter, if the user responds to the ring signal, for example, by selecting an "answer" function on keypad 27, the controller 10 receives the response from the user. The voice communication path is established through the audio processor 25 so that the user can communicate with the destination subscriber.

Although the voice communications of the portable terminal in the transmission and reception modes have been described, the portable terminal may also carry out a data communication function for communicating packet data and video data as well as the voice communications. Where the portable terminal is in a standby mode or carries out character communications, the controller 10 controls the display module 30 so that it can display character data processed by the data processor 23.

An operation of transmitting a character message using voice recognition in the portable terminal will be described. When the user of the portable terminal creates a message, the controller 10 controls the display module 30 so that it displays a status message associated with a voice/character conversion service. The user selects the voice/character conversion service in the portable terminal, for example, via keypad 27, and the controller 10 controls the portable terminal so that it is connected to the base station. After a connection between the portable terminal and the base station is established, a voice message from the user of the portable terminal is transmitted to the base station. The base station stores the received voice message and then converts the received voice message into the character message using, for example, speech recognition software. If the voice/character conversion by the base station has been completed, the base station transmits the character message to the portable terminal. The character message is then transmitted from the portable terminal to a destination terminal corresponding to a destination number inputted at the portable terminal.

An operation of transmitting a character message using voice recognition where the portable terminal fails to establish a voice communication path will be described. Where a calling party uses a voice message with the voice/character conversion service after the failure to establish the communication path, the portable terminal is connected to the base station under control of the controller 10. After a connection between the portable terminal and the base station, the voice message from the calling party is transmitted to the base station. Typically, the voice message is input directly from the user, through the portable terminal, to the base station after the connection is established. Alternatively, the voice message may be pre-stored in portable terminal and then transmitted to the base station when the connection is established. The base station stores the received voice message and then converts the received voice message into the character message. When the voice/character conversion by the base station has been completed, the base station transmits the character message to the portable terminal. The character message is then transmitted from the portable terminal to a destination terminal.

Figure 2:
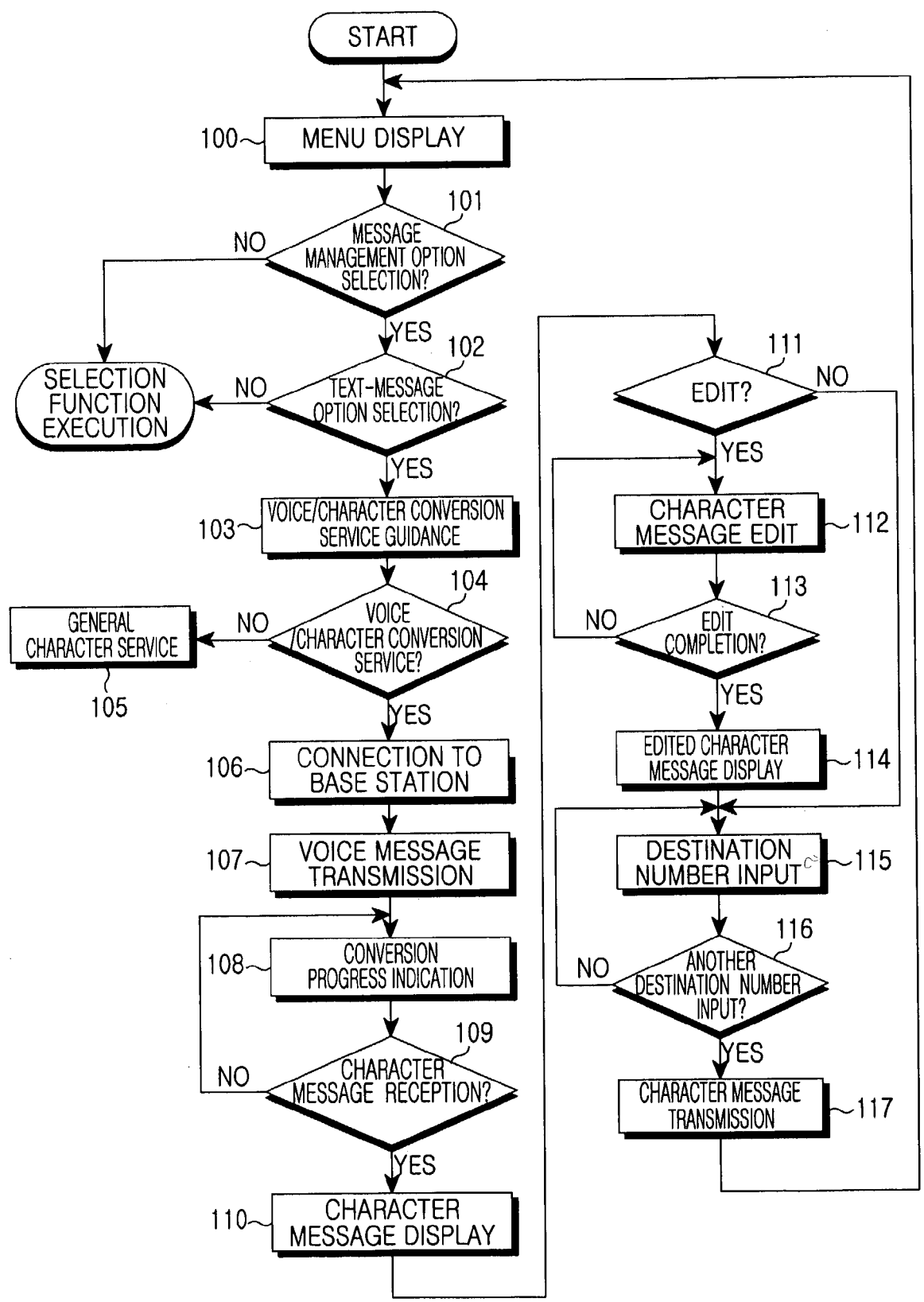
FIG. 2 is a flow chart illustrating a method for transmitting a character message using voice recognition in a portable terminal in accordance with a first embodiment of the present invention.
Figure 4:
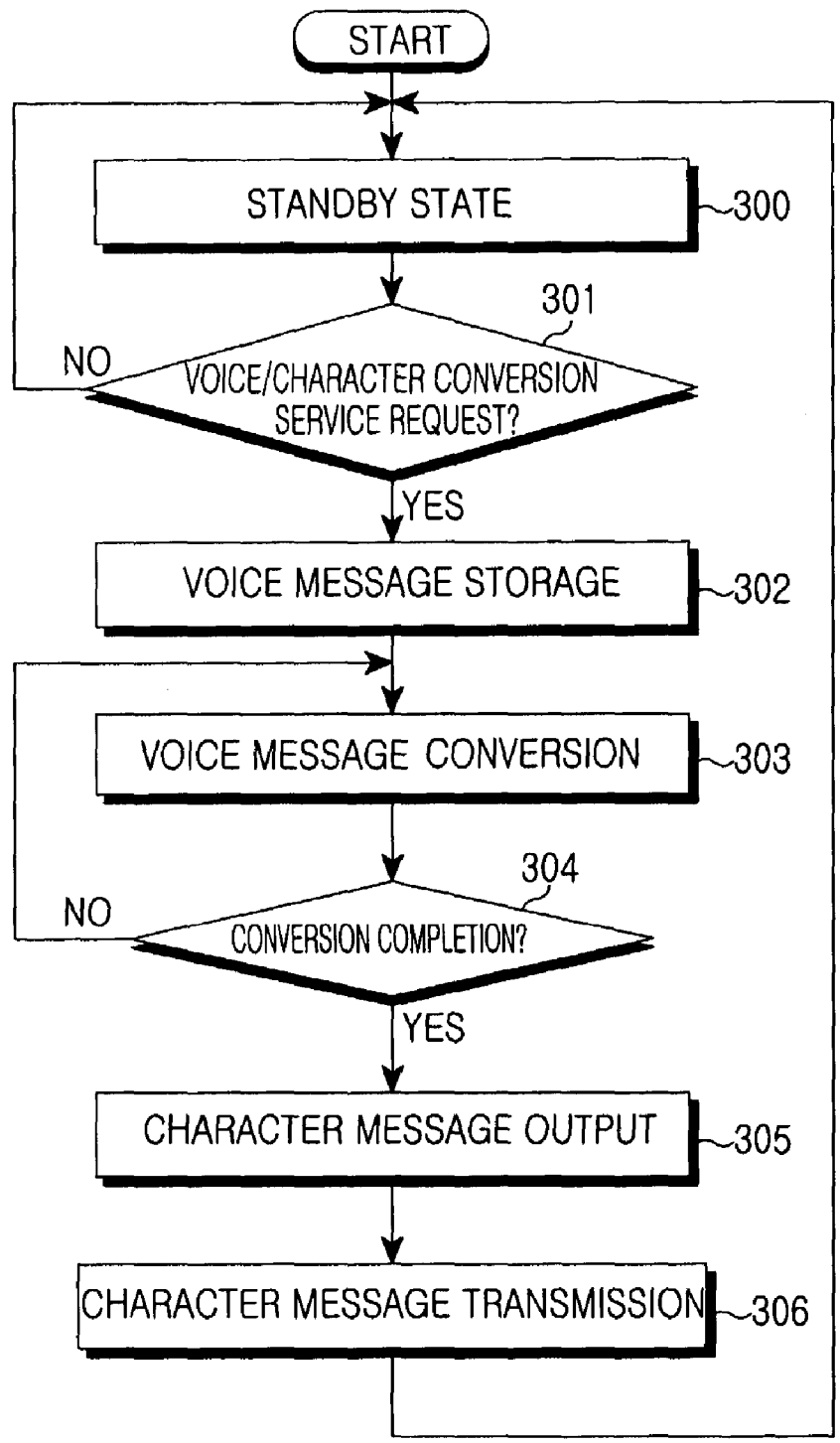
FIG. 4 is a flow chart illustrating a procedure of converting a voice message into a character message in a base station in accordance with the first and second embodiments of the present invention.

FIG. 2 is a flow chart illustrating a method for transmitting a character message using voice recognition in a portable terminal in accordance with a first embodiment of the present invention. FIG. 4 is a flow chart illustrating a procedure of converting a voice message into a character message in a base station in accordance with the first embodiment of the present invention.

Hereinafter, the first embodiment of the present invention will be described in detail with reference to FIGS. 1, 2 and 4.

If the user of the portable terminal inputs a menu key arranged on the keypad 27, the controller 10 receives the menu key input and then controls the display module 30 so that it can display a menu at step 100. If the user selects a message management option contained in the menu when the menu is displayed, the controller 10 receives the selection of the message management option from the user at step 101 and then controls the display module 30 so that it displays a list associated with types of messages. If the user of the portable terminal selects a text-messaging option contained in the list when the list associated with the types of messages is displayed, the controller 10 receives the selection of the text-messaging option from the user at step 102. Controller 10 then controls the display module 30 so that it can display a menu selection associated with a voice/character conversion service at step 103. If the user of the portable terminal does not select the voice/character conversion service at step 104, the controller 10 controls the portable terminal so that it can perform a general character service function at step 105.

If the user of the portable terminal selects the voice/character conversion service at the above step 104, the controller 10 controls the portable terminal so that it is connected to the base station at step 106. After a connection between the portable terminal and the base station, the controller 10 transmits the voice message and a conversion request from the user to the base station at step 107.

A controller included in the base station receiving the voice message from the portable terminal recognizes a voice/character conversion service request at step 301. The controller of the base station stores the received voice message in a memory included in the base station at step 302. Under control of the controller of the base station, the voice message stored in the memory of the base station is converted into a character message at step 303. At this time, the controller 10 of the portable terminal controls the display module 30 so that it displays status information indicating that the voice message is currently converted into the character message at step 108. If the voice/character conversion has been completed at the above step 303, the controller of the base station recognizes the voice/character conversion completion at step 304 and then outputs the character message at step 305. The character message outputted at step 305 is transmitted to the portable terminal at step 306.

If the character message outputted at the above step 305 is transmitted to the portable terminal, the controller 10 acknowledges the received character message at step 109 and then controls the display module 30 so that it displays the received character message at step 110. Where the user selects an edit option to edit the character message displayed on the display module 30, the controller 10 receives the selection of the edit option from the user at step 111, and enables the user to edit the character message using the keypad 27 at step 112. If editing of the character message has been completed, the controller 10 receives a user input that the character message edit is complete at step 113 and then controls the display module 30 so that it displays the edited character message at step 114. If the character message is completed, the user inputs a destination number in connection with steps 115 and 116. Thereafter, the character message is transmitted to a destination terminal corresponding to the inputted destination number at step 117.

Figure 3:
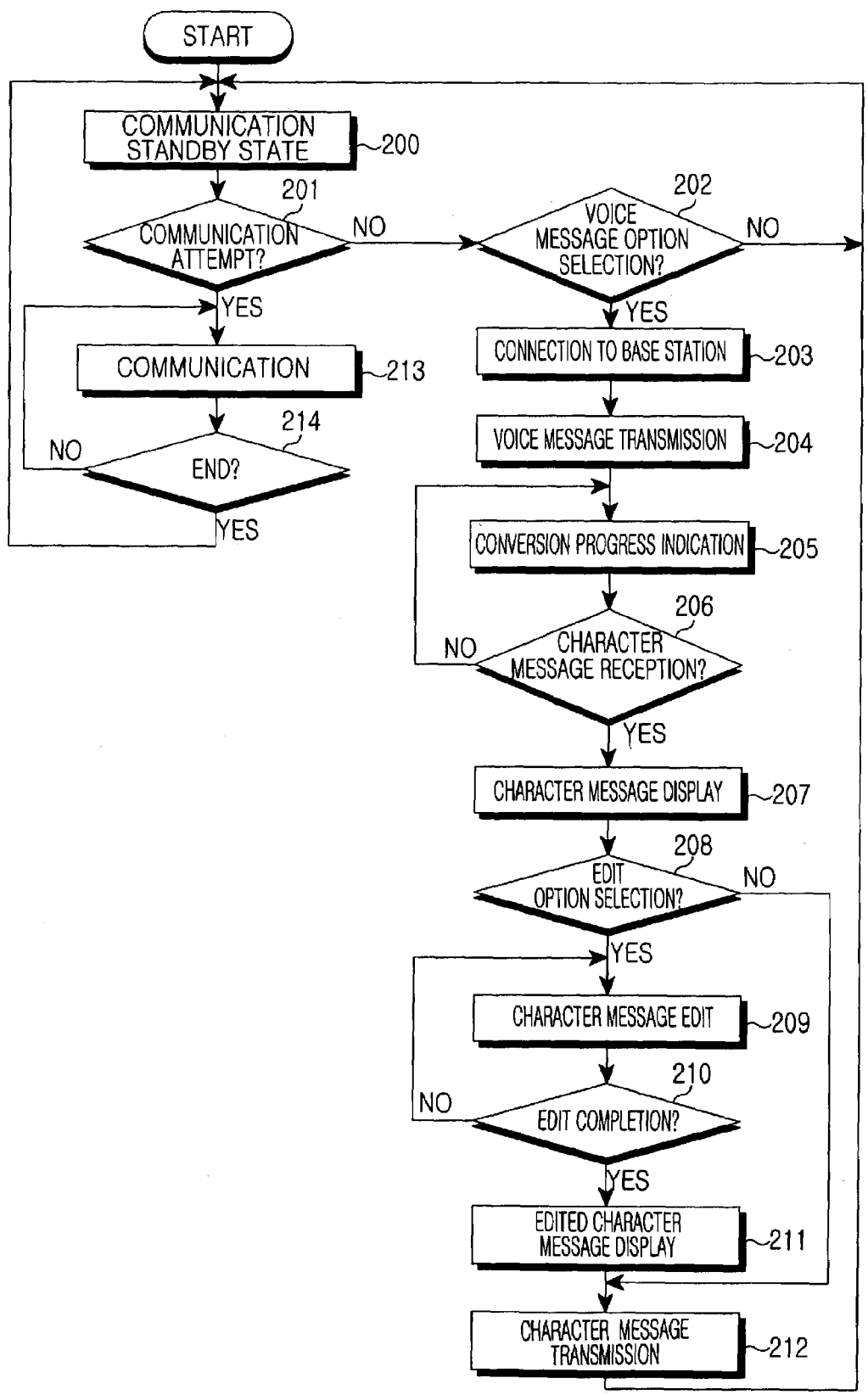
FIG. 3 is a flow chart illustrating a method for transmitting a character message using voice recognition in a portable terminal in accordance with a second embodiment of the present invention.

FIG. 3 is a flow chart illustrating a method for transmitting a character message using voice recognition in a portable terminal in accordance with a second embodiment of the present invention. FIG. 4 is a flow chart illustrating a procedure of converting a voice message into a character message in a base station in accordance with the second embodiment of the present invention.

Hereinafter, the second embodiment of the present invention will be described in detail with reference to FIGS. 1, 3 and 4.

If the user of the portable terminal tries to communicate with a called party in a communication standby state of step 200, the controller 10 receives the communication attempt and then informs the called party that a call signal is generated. When the called party fails to receive the call signal from the calling party (i.e., the user of the portable terminal), the controller 10 processes the call failure at step 201 and then transmits voice instructions to the calling party through the audio processor 25 so that the calling party can select a voice message for the called party. When the calling party selects a voice message option, the controller 10 of the portable terminal receives the selection of the voice message option at step 202 and then controls the portable terminal so that it connects to the base station at step 203.

A controller included in the base station receiving the voice message from the portable terminal at step 204 recognizes a voice/character conversion service request at step 301. The controller of the bases station stores the received voice message in a memory included in the base station at step 302. The voice message stored in the memory of the base station is converted into the character message at step 303 under control of the controller of the base station. At this time, under control of the controller 10, the display module 30 of the portable terminal displays status information indicating that the voice message is currently being converted into the character message at step 205. If the voice/character conversion has been completed at the above step 303, the controller of the base station recognizes the voice/character conversion completion at step 304 and then outputs the character message at step 305. The character message outputted at step 305 is transmitted to the portable terminal at step 306.

If the character message outputted at the above step 305 is transmitted to the portable terminal, the controller 10 acknowledges the character message at step 206 and then controls the display module 30 so that it displays the character message at step 207. When the user of the portable terminal selects an edition option to edit the character message displayed on the display module 30, the controller 10 receives the selection of the edit option from the user at step 208 so that the user can edit the character message through the keypad 27 at step 209. If the editing of the character message has been completed, the controller 10 receives a user input that the character message edit is complete at step 210 and then controls the display module 30 so that it displays the edited character message at step 211. The controller 10 controls the portable terminal so that it transmits the character message to the called party at step 212.

As apparent from the above description, the present invention provides a method for transmitting a character message using voice recognition in a portable terminal, which can reduce a period of time required to create the character message.

The method of the present invention allows a called party to receive a voice message left by a calling party as the character message. Thus, the called party does not have to pay a connection fee for retrieving a voice message.

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims which follow, along with their full scope of equivalents.

What is claimed is:

1. A method for transmitting a character message using voice recognition in a portable terminal, comprising the steps of:
   a) displaying a display item associated with selection of a voice/character conversion service;
   b) connecting the portable terminal to a base station when the voice/character conversion service is selected;
   c) transmitting a voice message from a user to the base station;
   d) storing the voice message in the base station;
   e) converting the voice message into a character message by the base station;
   f) transmitting the character message to the portable terminal;
   g) inputting a destination number at the portable terminal; and
   h) transmitting the character message to a destination terminal corresponding to the inputted destination number.

2. The method as set forth in claim 1, further comprising the step of:
   i) carrying out a general character service function when the voice/character conversion service is not selected.

3. A method for transmitting a character message using voice recognition in a portable terminal, comprising the steps of:
- a) selecting a voice message option when a corresponding destination terminal cannot receive a call from the portable terminal;
- b) connecting the portable terminal to a base station when the voice message option is selected;
- c) transmitting a user's voice message to the base station;
- d) storing the voice message in the base station;
- e) converting the stored voice message into a character message by the base station;
- f) transmitting the character message to the portable terminal; and
- g) transmitting the character message to the destination terminal.

4. The method as set forth in claim 1, further comprising the step of:

editing the character message received from the base station at the portable terminal.

5. The method as set forth in claim 3, further comprising the step of:

editing the character message received from the base station at the portable terminal.

\* \* \* \* \*